(12) United States Patent
Takagi

(10) Patent No.: US 7,949,667 B2
(45) Date of Patent: May 24, 2011

(54) INFORMATION PROCESSING APPARATUS, METHOD, AND PROGRAM

(75) Inventor: Tsuyoshi Takagi, Kanagawa (JP)

(73) Assignee: Sony Corporation (JP)

( * ) Notice: Subject to any disclaimer, the term of this patent is extended or adjusted under 35 U.S.C. 154(b) by 532 days.

(21) Appl. No.: 12/074,230

(22) Filed: Feb. 29, 2008

(65) Prior Publication Data

US 2009/0077067 A1  Mar. 19, 2009

(30) Foreign Application Priority Data

Mar. 1, 2007  (JP) ............... P2007-051354
Aug. 7, 2007  (JP) ............... P2007-205083
Nov. 26, 2007 (JP) ............... P2007-303993

(51) Int. Cl.
  *G06F 17/30*  (2006.01)
(52) U.S. Cl. ...................................... 707/755
(58) Field of Classification Search ............ 707/755
  See application file for complete search history.

(56) References Cited

U.S. PATENT DOCUMENTS

| | | | |
|---|---|---|---|
| 5,225,981 A | 7/1993 | Yokogawa et al. | |
| 5,819,265 A | 10/1998 | Ravin et al. | |
| 6,608,930 B1 | 8/2003 | Agnihotri et al. | |
| 6,925,650 B1 | 8/2005 | Arsenault et al. | |
| 2003/0229898 A1 * | 12/2003 | Babu et al. | 725/87 |
| 2005/0004930 A1 * | 1/2005 | Hatta | 707/102 |
| 2005/0125419 A1 * | 6/2005 | Mizutani et al. | 707/10 |
| 2006/0100963 A1 * | 5/2006 | Leurs et al. | 705/51 |
| 2007/0124752 A1 * | 5/2007 | Sakai | 725/8 |

FOREIGN PATENT DOCUMENTS

| | | |
|---|---|---|
| JP | 2004-134858 A | 4/2004 |
| JP | 2006-339947 A | 12/2006 |
| WO | 01/03425 | 1/2001 |

OTHER PUBLICATIONS

European Search Report, EP 08 15 2067, Jul. 14, 2008.

* cited by examiner

*Primary Examiner* — Neveen Abel-Jalil
*Assistant Examiner* — Kevin Young
(74) *Attorney, Agent, or Firm* — Lerner, David, Littenberg, Krumholz & Mentlik, LLP

(57) ABSTRACT

An information processing apparatus which may include acquisition means for acquiring meta-data of a content; morphological analyzing means for performing morphological analysis on text information included in the meta-data of the content; comparison means for comparing a morphological analysis result of the morphological analyzing means and a plurality of list patterns of predetermined performer names; and when there is a list pattern of predetermined performer names having matched at least one part or more out of the morphological analysis result on the basis of the comparison result of the comparison means, first extraction means for extracting a performer name with the list pattern of the matched predetermined performer name.

5 Claims, 16 Drawing Sheets

FIG. 2

FIRST PATTERN
- PERFORMER,  PERFORMER
- PERFORMER、 PERFORMER
- PERFORMER・PERFORMER
- PERFORMER   PERFORMER
- PERFORMER／PERFORMER
- PERFORMER<br>PERFORMER

SECOND PATTERN
- PERFORMER   (ROLE NAME)
- PERFORMER ⟶ ROLE NAME

THIRD PATTERN
- ROLE NAME       : PERFORMER
- ROLE NAME ・・・ PERFORMER
- ROLE NAME ............ PERFORMER
- ROLE NAME ... PERFORMER
- ROLE NAME ・・    PERFORMER

FOURTH PATTERN
- PERFORMER (GROUP NAME)

FIFTH PATTERN
- FOREIGN PERFORMER .... JAPANESE VOICE
- FOREIGN PERFORMER (JAPANESE VOICE)

SIXTH PATTERN
- FOREIGN ROLE NAME = FOREIGN PERFORMER (JAPANESE VOICE)

SEVENTH PATTERN
- FOREIGN PERFORMER JAPANESE KANA

EIGHTH
- FOREIGN ROLE NAME  . . .  FOREIGN PERFORMER  (JAPANESE KANA)         (JAPANESE KANA)

FIG. 11

PROGRAM CONTENTS

THIS TIME, A NEWLYWED ACTION-TALENTED ACTOR, TORIMI SHINNGO AND A HEAVY-DRINKING EXPERIENCED ACTRESS, FUJIKAWA YUMI CHALLENGE Mr. MILLIONAIRE. ATTENTION IS FOCUSED ON TORIMI, WHO GOT A CENTER SHEET SUDDENLY. HE FINALY HAD A CHANCE TO DIRECTLY CONFRONT Mr. MILLIONAIRE, NOMITANMO BY THIRD TIME LUCKY. THE DREAM OF ONE THOUSAND YEN IS "HE GIVES DELUXE BICYCLES TO GROUP MEMBERS AS PRESENTS, AND GOES ON A CYCLING TOUR WITH THEM". THE CHALLENGE OF TORIMI STARTS.

HOWEVER, TOPIC OF CONVERSATION CENTERED AROUND AN UNTOLD STORY OF SHOOTING OF "THIRD GRADE C-CLASS, TEACHER, KINKU" ASIDE FROM THE QUIZ. THE "FORMER TEACHER" TEKEGAWA TETSUYA PROCEEDED TO THE 14-TH QUESTION. TORIMI HAS PROCEEDED TO THE 14-TH QUESTION SIMILARLY AS THE FORMER TEACHER WITH THE HELP OF LIFE LINE AT THE RIGHT TIMING. TORIMI ENCOUNTERS QUESTIONS ON SPORTS. CAN TORIMI EVER GO BEYOND THE FORMER TEACHER?
IN ADDITION, FUJIKAWA, WHO CAME TO GAZE AT NOMI-SAN WITH EACH OTHER, HAS A DREAM OF CATCHING ONE THOUSAND YEN FOR THE SAKE OF "FUNDS FOR TOKYO PERFORMANCE OF DRAMA GROUP".

PERFORMER
HOST: NOMITANMO
GUEST CHALLENGER: TORIMI SHINNGO
FUJIKAWA YUMI
OTHERS

FIG. 12

SUBTITLE
MISO SOUP WITH ONE-WAY LOVE

PROGRAM CONTENTS
SINCE KISSED BY HARUKI (ODA KEISUKE), SUZUKO (TANIGAWA KYOKO) MET HARUKI IN HER DREAM, AND IS PERPLEXED WITH THE THINKING OF HARUKI UNCONCIOUSLY.
ON THE OTHER HAND, HARUKI, WHO HAD KISSED SUZUKO BECAUSE HE WAS DEAD DRUNKEN, HAS NO MEMORY OF HAVING KISSED HER, ATTENDED THE SECOND ANNIVERSARY OF HIS BROTHER'S DEATH. HE HAS PROSOSED TO SAORI (OOBAYASHI MAO), WHO HAD BEEN HIS BROTHER'S LOVER AND ATTENDEE TO THE BUDDHIST MEMORIAL SERVICE, BUT FAILED TO RECEIVE A FAVORABLE REPLY ...
AN UNEXPECTED PERSON CAME OVER TO THE TWO PERSONS.

PERFORMER
KUROISHI SUZUKO : TANIGAWA KYOKO
KUZUYAMA HARUKI : ODA KEISUKE
SHIMANAKA SAORI : OOBAYASHI MAO
OOKAGE TAMIO : HIGASHIMURA MASAHIKO
FUKAKURA MICHIRU : SACHIKO
KASHIWAMOTO MAKI : OOIKE EIKO
OOKAGE TAKANOBU : IWAI MASANORI
KUROISHI TORU : AMANO HIROKI
KUZUYAMA MICHIZO : NAKADUME ISAO

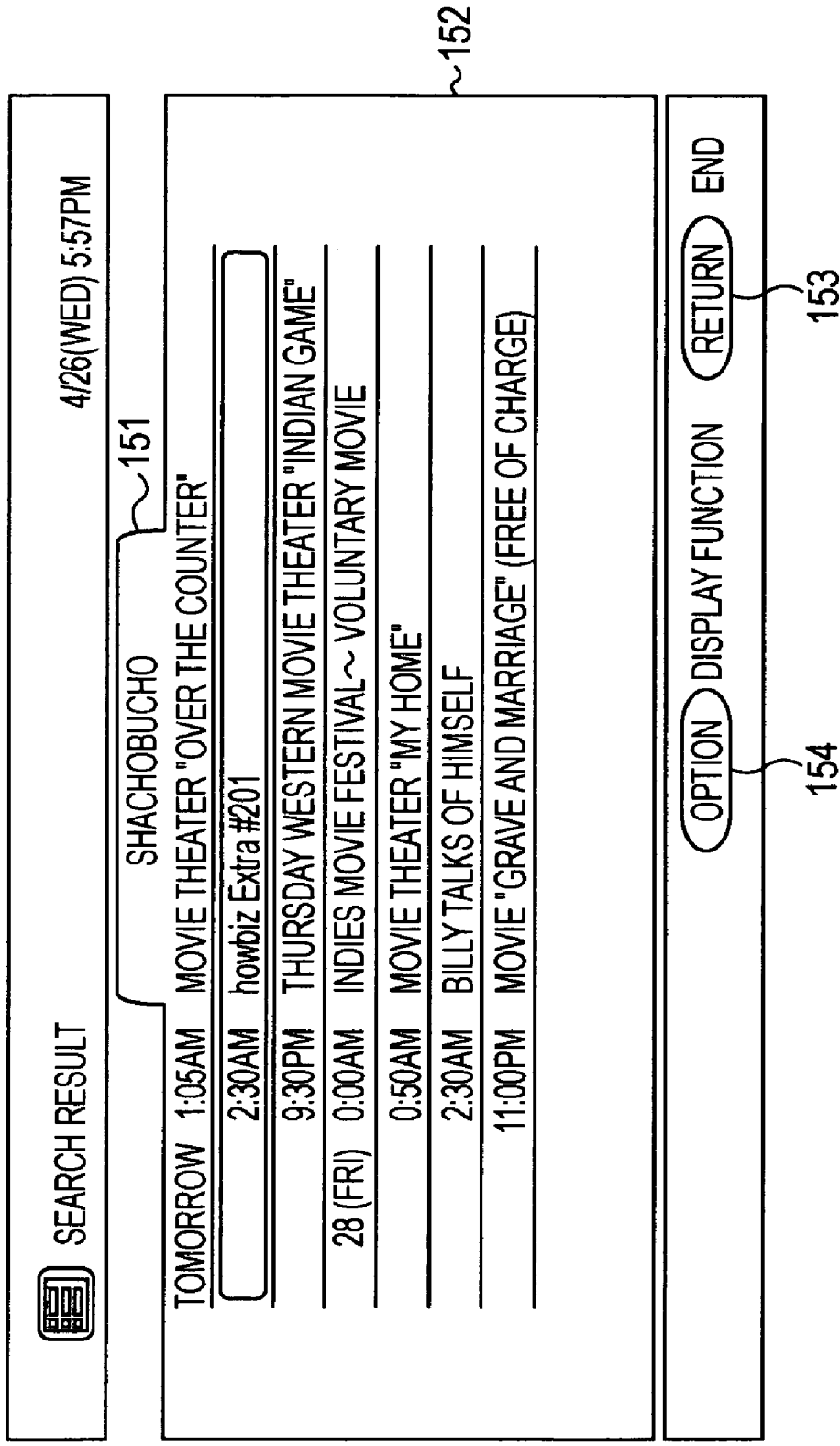

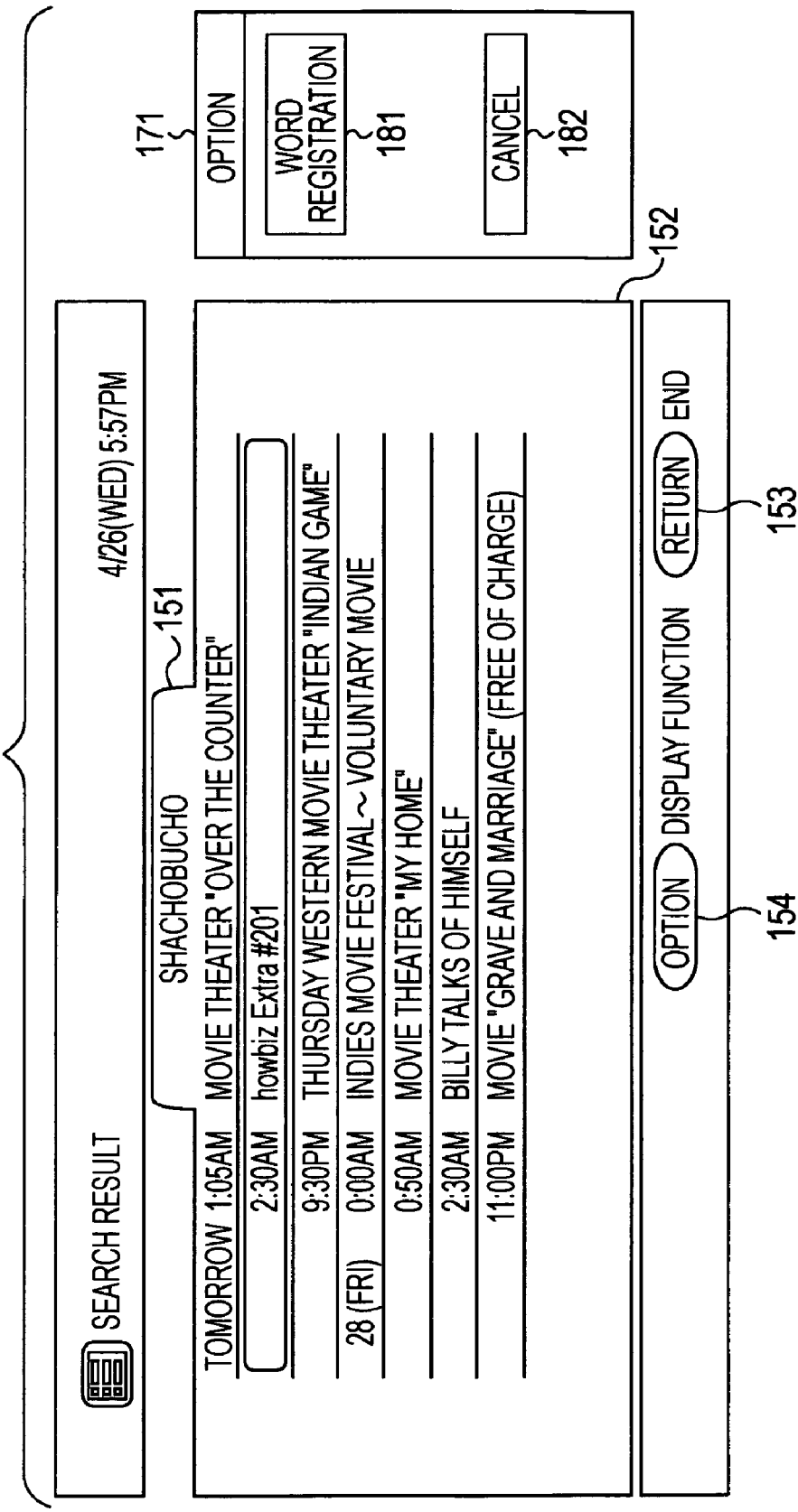

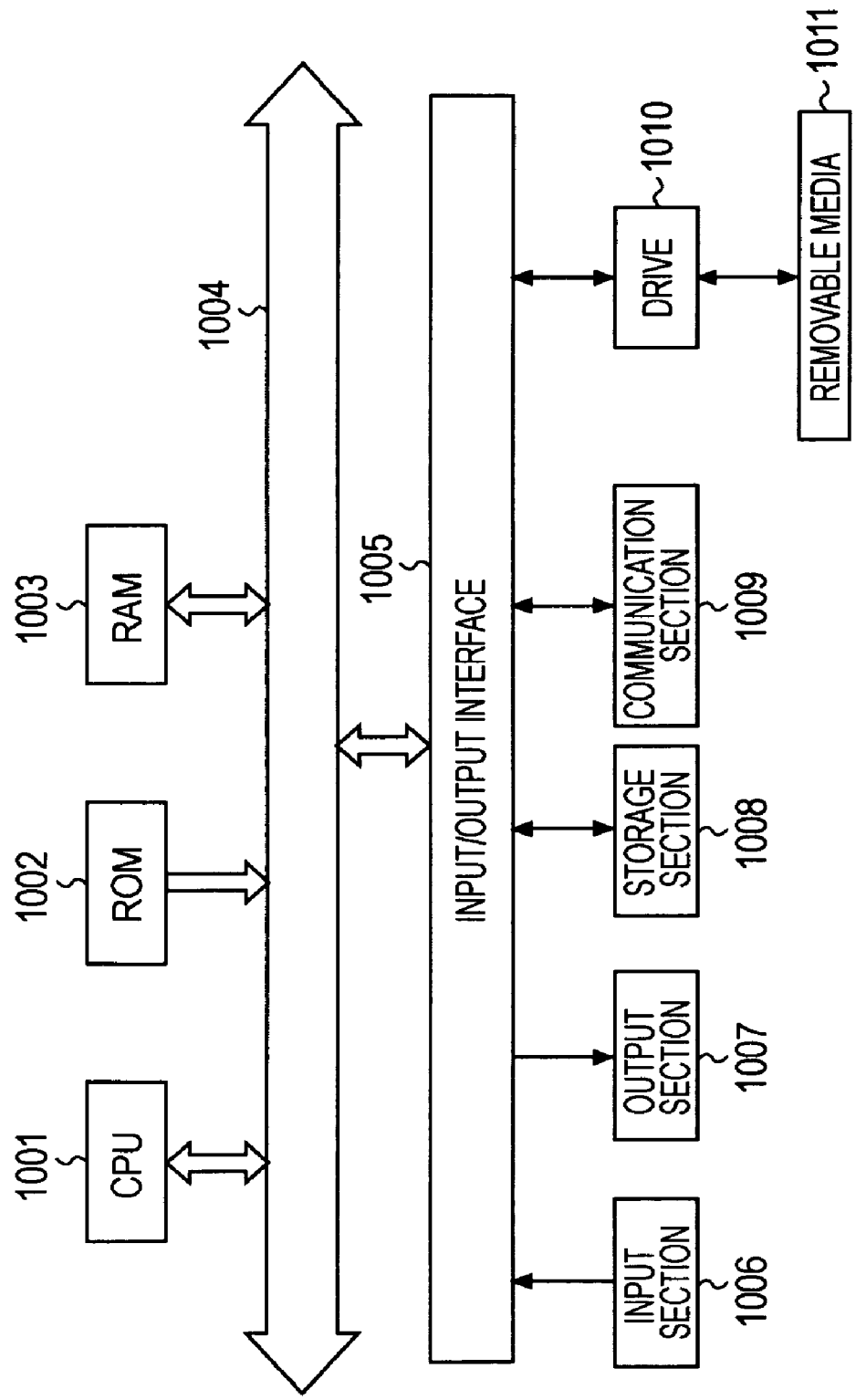

INFORMATION PROCESSING APPARATUS, METHOD, AND PROGRAM

CROSS-REFERENCE TO RELATED APPLICATIONS

This application claims priority from Japanese Patent Application Nos. JP 2007-051354, JP 2007-205083, and JP 2007-303993 filed in the Japanese Patent Office on Mar. 1, 2007, Aug. 7, 2007, and Nov. 26, 2007, respectively, the entire contents of which are incorporated herein by reference.

BACKGROUND OF THE INVENTION

1. Field of the Invention

The present invention relates to an information processing apparatus, method, and program, and particularly to an information processing apparatus, method, and program for allowing a user to efficiently extract information on performer names of the content out of information included in meta-data of a content.

2. Description of the Related Art

Techniques for selecting a program, which is a content, using an electric program guide including meta-data of a content, which is called an EPG (Electric Program Guide), and for reserving the selected program on the EPG are being widespread popularly.

In order to extract a keyword to be used for automatic recording, a technique which allows extracting more appropriate information as the keyword reliably and easily has been proposed (Japanese Unexamined Patent Application Publication No. 2006-339947).

Also, a technique which reliably searches a desired program even when a program name included in an EPG is omitted with the passage of time has been proposed (Japanese Unexamined Patent Application Publication No. 2004-134858).

SUMMARY OF THE INVENTION

Up to date, if information on performer names of a program, which is a content, has intended to be extracted from the meta-data of the content, such as EPG, etc., personal names have been allowed to be searched by morphological analysis. However, when performer names are intended to be simply extracted, role names and other personal names are sometimes extracted as well, because a personal name is difficult to be identified as either a role name or a performer name.

The present invention has been made in view of these circumstances. It may be desirable to allow efficient extraction of information on performer names of a program, which is a content out of information included in the meta-data of a content, such as an electric program guide (EPG) in particular.

According to an embodiment of the present invention, there is provided an information processing apparatus which may include acquisition means for acquiring meta-data of a content; morphological analyzing means for performing morphological analysis on text information included in the meta-data of the content; comparison means for comparing a morphological analysis result of the morphological analyzing means and a plurality of list patterns of predetermined performer names; and when there is a list pattern of predetermined performer names having matched at least one part or more out of the morphological analysis result on the basis of the comparison result of the comparison means, first extraction means for extracting a performer name with the list pattern of the matched predetermined performer name.

The embodiment of the present invention may further include layout recognition means for recognizing a layout for each described content from the morphological analysis result of the morphological analyzing means, wherein the comparison means may compare information of outside performer-name field out of a layout of the morphological analysis result of the morphological analyzing means recognized by the layout recognition means with.

The embodiment of the present invention may further include layout recognition means for recognizing a layout for each described content from the morphological analysis result of the morphological analyzing means; similarity-distance calculation means for calculating a similarity distance between information of inside performer-name field out of a layout of the morphological analysis result of the morphological analyzing means recognized by the layout recognition means and a plurality of list patterns of predetermined performer names; and second extraction means for extracting a performer name with a list pattern of predetermined performer names having a smallest similarity distance out of the morphological analysis result on the basis of the similarity-distance calculation result of the similarity-distance calculation means.

In the above-described embodiment, the list pattern of predetermined performer names may include a list pattern of "performer name, symbol, performer name, symbol . . . ", "performer name, symbol, role name, performer name, . . . ", "role name, symbol, performer name, symbol, role name . . . ", or "performer name, performer name . . . ".

In the above-described embodiment, the content may include a television program, and the meta-data includes information on the television program.

According to another embodiment of the present invention, there is provided a method of processing information, which may include acquiring meta-data of a content; morphological analyzing on text information included in the meta-data of the content; comparing a morphological analysis result of the morphological analyzing and a plurality of list patterns of predetermined performer names; and when there is a list pattern of predetermined performer names having matched at least one part or more out of the morphological analysis result on the basis of the comparison result of the comparing, first extracting a performer name with the list pattern of the matched predetermined performer name.

According to another embodiment of the present invention, there is provided a program for causing a computer to perform processing which may include acquiring meta-data of a content; morphological analyzing on text information included in the meta-data of the content; comparing a morphological analysis result of the morphological analyzing and a plurality of list patterns of predetermined performer names; and when there is a list pattern of predetermined performer names having matched at least one part or more out of the morphological analysis result on the basis of the comparison result of the comparing, first extracting a performer name with the list pattern of the matched predetermined performer name.

A program storage medium according to another embodiment of the present invention may store the above-described program.

In an information processing apparatus, method, and program according to an embodiment of the present invention, meta-data of a content may be acquired, text information included in the meta-data of the content may be subjected to morphological analysis, a comparison may be made between a morphological analysis result of the morphological analyzing means and a plurality of list patterns of predetermined performer names, and when there is a list pattern of predetermined performer names having matched at least one part or more out of the morphological analysis result on the basis of the comparison result of the comparison means, a performer name may be extracted with the list pattern of the matched predetermined performer name.

An information processing apparatus of the present invention may be an independent apparatus, or may be a block which performs information processing.

According to an embodiment of the present invention, it may become possible to efficiently extract information on performer names of the content out of information included in the meta-data of a content.

BRIEF DESCRIPTION OF THE DRAWINGS

FIG. 2 is a diagram illustrating list patterns of performer names;

FIG. 11 is a diagram illustrating the outside performer field determination processing;

FIG. 12 is a diagram illustrating the outside performer field determination processing;

FIG. 14 is a diagram illustrating a display example of a display screen when a personal name is selected;

FIG. 15 is a diagram illustrating a display example of a display screen when word registration is instructed; and FIG. 16 is a diagram illustrating an example of a configuration of a personal computer.

DETAILED DESCRIPTION

In the following, a description will be given of an embodiment of the present invention. The relationship between the invention described in this specification and the embodiment of the invention is exemplified as follows. This description is for confirming that an embodiment supporting the present invention is included in the specification or the drawings. Accordingly, if there is an embodiment included in the invention, but not included here as an embodiment corresponding to the invention, the fact does not mean that the embodiment does not corresponds to the invention. On the contrary, if an embodiment is included here as constituent features corresponding to the present invention, the fact does not mean the embodiment does not correspond to the invention other than the present invention.

Furthermore, this description does not mean all the invention described in this specification. To put it another way, this description is on the invention described in this specification, and does not deny that there is an invention not claimed in this application, that is to say, does not deny that there is an invention which will be subjected to divisional application and amendment by appearance and addition.

Figure 1:
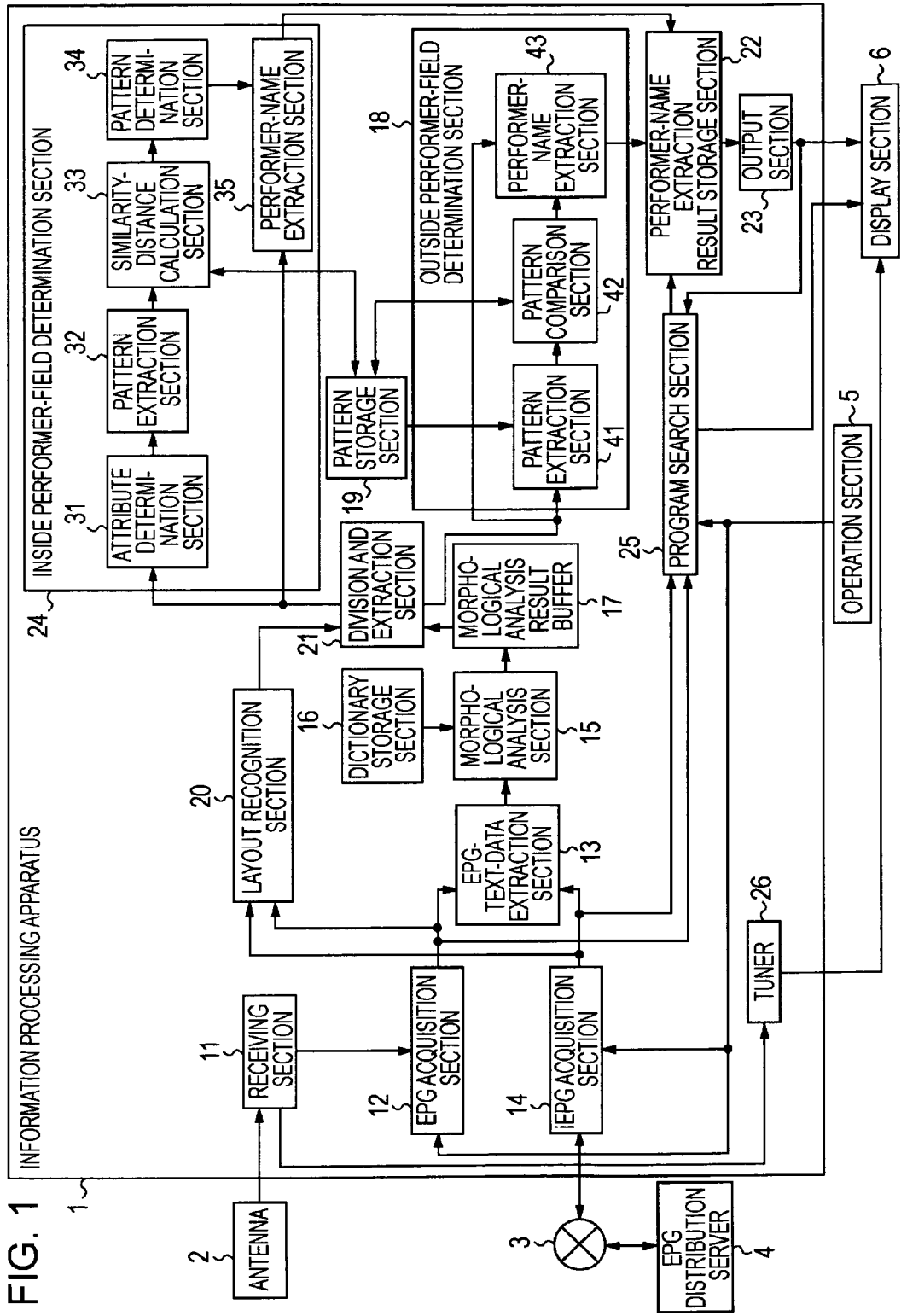
FIG. 1 is a block diagram illustrating an example of a configuration of an information processing apparatus to which the present invention is applied.

That is to say, according to an embodiment of the present invention, there is provided an information processing apparatus including: acquisition means (for example, the EPG acquisition section 12 or the iEPG acquisition section 14 in FIG. 1) for acquiring meta-data of a content; morphological analyzing means (for example, the morphological analysis section 15 in FIG. 1) for performing morphological analysis on text information included in the meta-data of the content; comparison means (for example, the pattern comparison section 42 in FIG. 1) for comparing a morphological analysis result of the morphological analyzing means and a plurality of list patterns of predetermined performer names; and when there is a list pattern of predetermined performer names having matched at least one name or more out of the morphological analysis result on the basis of the comparison result of the comparison means, extraction means (for example, the performer-name extraction section 43 in FIG. 1) for extracting a performer name with the list pattern of the matched predetermined performer name.

The embodiment of the present invention may further include layout recognition means (for example, the layout recognition section 20 in FIG. 1) for recognizing a layout for each described content from the morphological analysis result of the morphological analyzing means, wherein the comparison means (for example, the pattern comparison section 42 in FIG. 1) may compare information of outside performer-name field out of a layout of the morphological analysis result of the morphological analyzing means recognized by the layout recognition means with.

The embodiment of the present invention may further include layout recognition means (for example, the layout recognition section 20 in FIG. 1) for recognizing a layout for each described content from the morphological analysis result of the morphological analyzing means; similarity-distance calculation means (for example, the similarity-distance calculation section 33 in FIG. 1) for calculating a similarity distance between information of inside performer-name field out of a layout of the morphological analysis result of the morphological analyzing means recognized by the layout recognition means and a plurality of list patterns of predetermined performer names; and second extraction means (for example, the performer-name extraction section 35 in FIG. 1) for extracting a performer name with a list pattern of predetermined performer name having a smallest similarity distance out of the morphological analysis result on the basis of the similarity-distance calculation result of the similarity-distance calculation means.

According to another embodiment of the present invention, there is provided a method of processing information, including the steps of: EPG acquiring (for example, step S2 in FIG. 3) for acquiring meta-data of a content; morphological analyzing (for example, step S4 in FIG. 3) on text information included in the meta-data of the content; comparing (for example, step S53 in FIG. 10) a morphological analysis result of the step of morphological analyzing and a plurality of list patterns of predetermined performer names; and when there is a list pattern of predetermined performer names having matched at least one name or more out of the morphological analysis result on the basis of the comparison result of the comparison means, extracting (for example, step S55 in FIG. 10) a performer name with the list pattern of the matched predetermined performer name.

FIG. 1 illustrates a configuration of an information processing apparatus according to an embodiment of the present invention.

An information processing apparatus 1 acquires an EPG (Electric Program Guide) including meta-data of a content distributed by a network, such as represented by the Internet, etc., a broadcast wave, etc., extracts performer names as keywords from information of a program (content) included in the electric program guide, and display the program corresponding to the performer names selected by an operation section 5, such as a remote controller, etc., including an operation button, a keyboard, and the like out of the extracted performer names.

The receiving section 11 receives a broadcast wave through an antenna 2, and supplies a signal to an EPG acquisition section 12 and a tuner 26. The EPG acquisition section 12 acquires EPG (Electric Program Guide) information out of the signal supplied from the receiving section 11, and supplies the information to an EPG-text-data extraction section 13, a layout recognition section 20, and a program search section 25.

An iEPG acquisition section 14 accesses an EPG distribution server 4 specified by a predetermined URL (Uniform Resource Locator), etc., through a network 3, such as represented by the Internet, acquires the EPG information, and supplies the information to the EPG-text-data extraction section 13, the layout recognition section 20, and the program search section 25.

The EPG-text-data extraction section 13 extracts text data from each of the EPG information supplied from the EPG acquisition section 12 or the EPG information supplied from the iEPG acquisition section 14, and supplies the data to a morphological analysis section 15.

The morphological analysis section 15 divides the text data of the EPG information into minimum units (hereinafter, this is called a word) of a language, checked each word with information registered in a dictionary storage section 16 to identify a part of speech, thereby performing morphological analysis processing. The result is stored in a morphological analysis result buffer 17.

The layout recognition section 20 recognizes a layout for each information displayed as an EPG on the basis of the EPG information supplied by the EPG acquisition section 12 or the iEPG acquisition section 14, and supplies the recognized layout information to a division and extraction section 21.

The division and extraction section 21 recognizes the location of the performer field in which performer names are described, reads information inside the performer field from the morphological analysis result buffer 17 on the basis of the layout information supplied from the layout recognition section 20 to supply the information to an inside performer-field determination section 24 and reads information outside the performer field from the morphological analysis result buffer 17 to supply the information to an outside performer-field determination section 18. In this regard, a detailed description will be given of the performer field later.

The outside performer-field determination section 18 extracts performer names out of the information displayed as an EPG on the basis of the morphological analysis result included in the area other than the layout of the performer field to store the performer names into the performer-name extraction result storage section 22.

A pattern extraction section 41 of the outside performer-field determination section 18 reads in sequence any one of a plurality of attribute list patterns stored in a pattern storage section 19, extracts a word being in the outside performer field stored in the morphological analysis result buffer 17 with the list pattern and information of the corresponding attribute, and supplies them to a pattern comparison section 42.

The attribute pattern mentioned here is a list pattern having an attribute of a performer name, a role name, a foreign performer, a Japanese voice, a foreign role name, Japanese Kana, and a group name, and for example includes a first pattern to an eighth pattern as shown in FIG. 2.

The first pattern includes, for example, "performer, performer", "performer; performer", "performer.performer", "performer performer", "performer/performer", and "performer<line break>performer". This pattern includes some kind of symbol (including a space and a line break) between performer names, and is a list including performer names continuously.

Also, the second pattern includes, for example, "performer (role name)", and "performer→role name". This pattern is a continuous list in which a role name is disposed next to a performer name and some kind of symbol (including a space and a line break) is included therebetween.

Further, the third pattern includes, for example, "role name: performer", "role name . . . performer", "role name . . . performer", "role name . . . performer" and "role name . . . performer". This pattern is a continuous list in which a performer name is disposed next to a role name and some kind of symbol (including a space and a line break) is included therebetween.

Also, the fourth pattern includes, for example, "performer (group name)". This pattern is a continuous list in which a group name including the performer is disposed next to a performer.

Further, the fifth pattern includes, for example, "foreign performer . . . Japanese voice" and "foreign performer (Japanese voice)". This pattern is a continuous list in which a dubbing Japanese name is disposed next to a foreign performer name, and some kind of symbol sandwiches them. The foreign performer name mentioned here is a personal name described by Japanese Katakana and alphabets.

Also, the sixth pattern includes, for example, "foreign role name=foreign performer (Japanese voice)". This pattern is a continuous list in which a symbol is disposed next to a foreign role name, and a foreign performer name is disposed next to that, and a dubbing Japanese name is disposed in parentheses next to it.

Furthermore, the seventh pattern includes, for example, "foreign performer Japanese Kana". This pattern is a continuous list in which Japanese Kana is disposed next to a foreign performer.

Also, the eighth pattern includes, for example, "foreign role name . . . foreign performer (Japanese Kana)". This pattern is a continuous list in which Japanese Kana in parentheses is disposed next to a foreign role name, some kind of symbol is disposed next, further, a foreign performer name is disposed, and furthermore, Japanese Kana in parentheses is disposed next.

The performer name in the first to the eighth pattern includes a personal name as a part of speech as a matter of course, and further includes an attribute for identifying the famous person, such as an actress name, actor name, a singer name, etc. Also, the role name includes, as an attribute, a word indicating a title, such as a "host", a "producer", etc., and also includes a personal name on a stage in a story.

The pattern comparison section 42 compares an attribute list pattern extracted from the morphological analysis result buffer 17 by the pattern extraction section 41 on the assumption that the list pattern is any one of list patterns of the first to the eighth pattern described above, and stored in the pattern storage section 19, and the assumed list pattern, and determines whether the patterns match.

A performer-name extraction section 43 extracts information on the performer names using the matched list pattern on the basis of the comparison result of the pattern comparison section 42, and stores the performer names into the performer-name extraction result storage section 22.

The inside performer-field determination section 24 extracts performer names out of the information displayed as an EPG on the basis of the morphological analysis result included in the area inside of the performer field, and stores the performer names into the performer-name extraction result storage section 22.

An attribute determination section 31 determines each attribute of the word supplied from the division and extraction section 21, and supplies the attribute to a pattern extraction section 32. The pattern extraction section 32 extracts an attribute pattern on the basis of the attribute determination result supplied from the attribute determination section 31, and supplies the attribute pattern to a similarity-distance calculation section 33. The similarity-distance calculation section 33 calculates a similarity distance indicating a similarity between the pattern supplied from the pattern extraction section 32 and the pattern stored in the pattern storage section 19, and supplies the similarity in sequence to a pattern determination section 34. The pattern determination section 34 recognizes a pattern having the smallest similarity distance to be a pattern extracted by the pattern extraction section 32 on the basis of the information of the similarity distance supplied from the similarity-distance calculation section 33, determines the extracted pattern, and supplies the determined pattern to a performer-name extraction section 35. The performer-name extraction section 35 extracts only performer names from the words supplied from the division and extraction section 21 on the basis of the patterns supplied from the pattern determination section 34, and stores the performer names into the performer-name extraction result storage section 22.

An output section 23 outputs the performer names stored in the performer-name extraction result sot section 22.

Next, with reference to the flowchart in FIG. 3, a description will be given of performer-name extraction processing.

In step S1, the EPG acquisition section 12 or the iEPG acquisition section 14 determines whether the operation section 5 has been operated and an instruction has been given to display performer names, and the same processing is repeated until it is determined that the instruction has been given. For example, if an option tab 101 as shown in FIG. 4 is displayed and a button 116 on which "personal name" is described is operated, an instruction to display the performer names is assumed to have given, and the processing proceeds to step S2.

Figure 4:
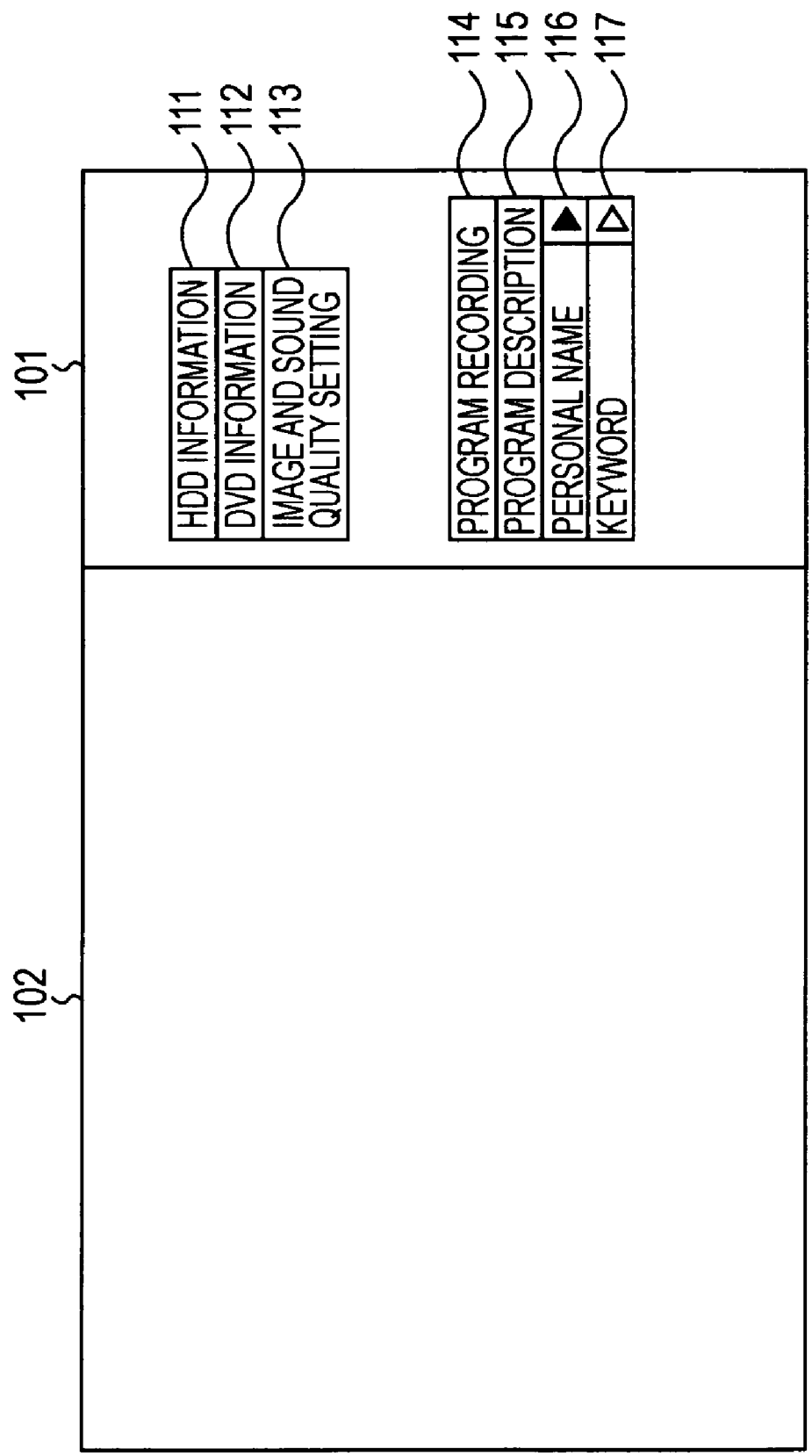
FIG. 4 is a diagram illustrating an example of a display image when the performer-name extraction processing is performed.

In this regard, FIG. 4 illustrates an example of an image displayed on the display section 6. A display field 102 of a normal broadcast program whose channel is selected by the tuner 26 is provided at the left side of an option tab 101. On the option tab 101, buttons 111 to 117 on which "HDD information", "DVD information", "image and sound quality setting", "program recording", "program description", "personal name", and "keyword" are displayed, respectively, are displayed. The button 111 is operated when information of a program recorded in the HDD (Hard Disk Drive) not shown in the figure is displayed. The button 112 is operated when program information recorded on a DVD inserted in a DVD (Digital Versatile Disk) drive not shown in the figure is displayed. The button 113 is operated when image and sound quality is set. The button 114 is operated when a program is recorded. The button 115 is operated when the program description, included in the EPG, of the program being displayed in the display field 102 is displayed. The button 116 is operated when the performer names, included in the EPG, of the program being displayed in the display field 102 is displayed as personal names. The button 117 is operated when the keywords, included in the EPG, of the program being displayed in the display field 102 is displayed.

In step S2, the EPG acquisition section 12 acquires the EPG information of a predetermined program included in the broadcast wave received by the antenna 2 through the receiving section 11, and supplies the information to the EPG-text-data extraction section 13 and the layout recognition section 20. Alternatively, the iEPG acquisition section 14 accesses the EPG distribution server 4 specified by a predetermined URL on the network 3, acquires the EPG information of a predetermined program, and supplies the information to the EPG-text-data extraction section 13 and the layout recognition section 20.

In step S3, the EPG-text-data extraction section 13 extracts text data from the supplied EPG information, and supplies the data to the morphological analysis section 15.

In step S4, the morphological analysis section 15 divides the text data of the supplied EPG information into words on the basis of the information stored in the dictionary storage section 16, identifies a part of speech of each word, and stores the result into the morphological analysis result buffer 17. In the morphological analysis by the morphological analysis section 15 using the dictionary storage section 16, if a part of speech is a personal name out of a noun, it is possible to specify a personal name as the part of speech. Also, out of personal names, for example, a famous actor name, a famous actress name, a famous actress name, a famous singer name, etc., it is possible to specify an attribute that the personal name is an actor name, an actress name, or a singer name. Accordingly, the morphological analysis section 15 not only identifies a grammatical part of speech for each word, but also classifies whether the word is a personal name, a product name, or a district name, etc., in the case of a noun. Further, in the case of a personal name, the morphological analysis section 15 classifies the word including an attribute on whether it is an actor name, an actress name, or a singer name in the case of a personal name.

In step S5, the layout recognition section 20 recognizes a layout on the basis of the display information of the EPG supplied from the EPG acquisition section 12 or the iEPG acquisition section 14, and supplies the recognition result to the division and extraction section 21. For example, when the EPG information is displayed as shown in FIG. 5, the layout recognition section 20 recognizes the layout as follows.

Figure 5:
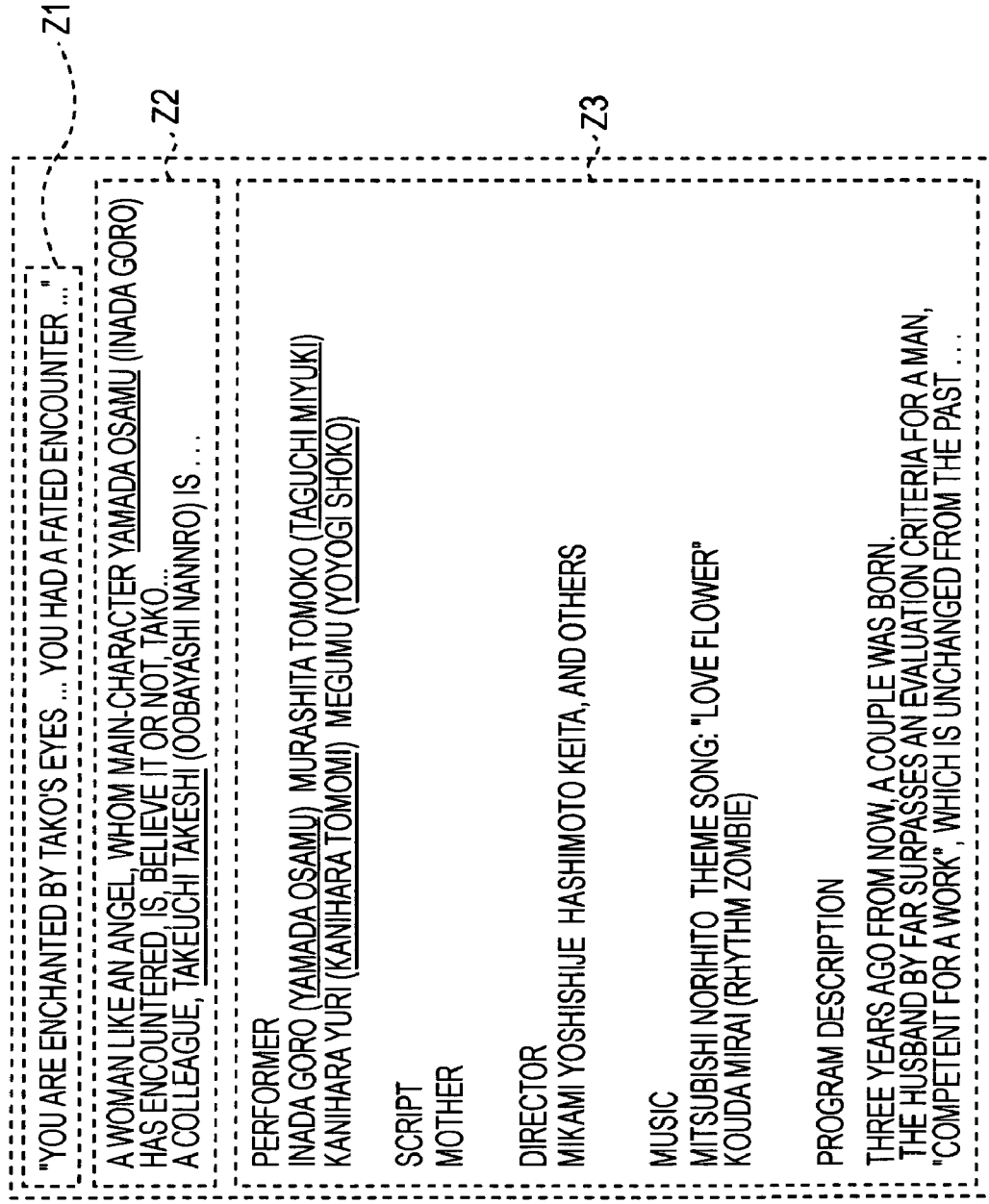
FIG. 5 is a diagram illustrating the performer-name extraction processing.

In the case of FIG. 5, the layout recognition section 20 recognizes, as a title display field, an uppermost area Z1 in which "YOU ARE ENCHANTED BY TAKO'S EYES . . . YOU HAD A FATED ENCOUNTER . . ." is displayed. Also, the layout recognition section 20 recognizes, as a story description field, an area Z2 in the middle, in which "A WOMAN LIKE AN ANGEL, WHOM MAIN-CHARACTER YAMADA OSAMU (INADA GORO) HAS ENCOUNTERED, IS, BELIEVE IT OR NOT, TAKO . . . A COLLEAGUE, TAKEUCHI TAKESHI (OOBAYASHI NANNRO) IS . . . " is displayed. Furthermore, the layout recognition section 20 recognizes, as a program detailed description field, a lowermost area Z3, in which "PERFORMER INADA GORO (YAMADA OSAMU) MURASHITA TOMOKO (TAGUCHI MIYUKI) KANIHARA YURI (KANIHARA TOMOMI) MEGUMU (YOYOGI SHOKO) SCRIPT MOTHER DIRECTOR MIKAMI YOSHISHIJE HASHIMOTO KEITA, AND OTHERS MUSIC MITSUBISHI NORIHITO THEME SONG: "LOVE FLOWER" KOUDA MIRAI (RHYTHM ZOMBIE) PROGRAM DESCRIPTION THREE YEARS AGO FROM NOW, A COUPLE WAS BORN. THE HUSBAND BY FAR SURPASSES AN EVALUATION CRITERIA FOR A MAN, "COMPETENT FOR A WORK", WHICH IS UNCAHNGED FROM THE PAST." is displayed. The EPG display screen sometimes has a different order of the disposition of areas shown by the above-described the areas Z1 to Z3, but has the areas having the similar structure. Thus, the layout recognition section 20 recognizes (estimates) these areas from the attributes.

Furthermore, the layout recognition section 20 particularly recognizes the description field (an area Z3' described below) of "PERFORMER INADA GORO (YAMADA OSAMU) MURASHITA TOMOKO (TAGUCHI MIYUKI) KANIHARA YURI (KANIHARA TOMOMI) MEGUMU (YOYOGI SHOKO)" as a performer field in the area Z3. That is to say, in the case of FIG. 5, the layout recognition section 20 recognizes a set of words including the description "PERFORMER" as a performer field.

In step S6, the division and extraction section 21 extracts the words inside of the performer field from the morphological analysis result buffer 17 on the basis of the layout information, and supplies the words to the inside performer-field determination section 24.

In step S7, the division and extraction section 21 extracts the words outside of the performer field from the morphological analysis result buffer 17 on the basis of the layout information, and supplies the words to the outside performer-field determination section 18.

In step S8, the inside performer-field determination section 24 performs inside performer-field determination processing, extracts the words of the performers from the words inside of the performer field, and stores the words into the performer-name extraction result storage section 22.

Figure 6:
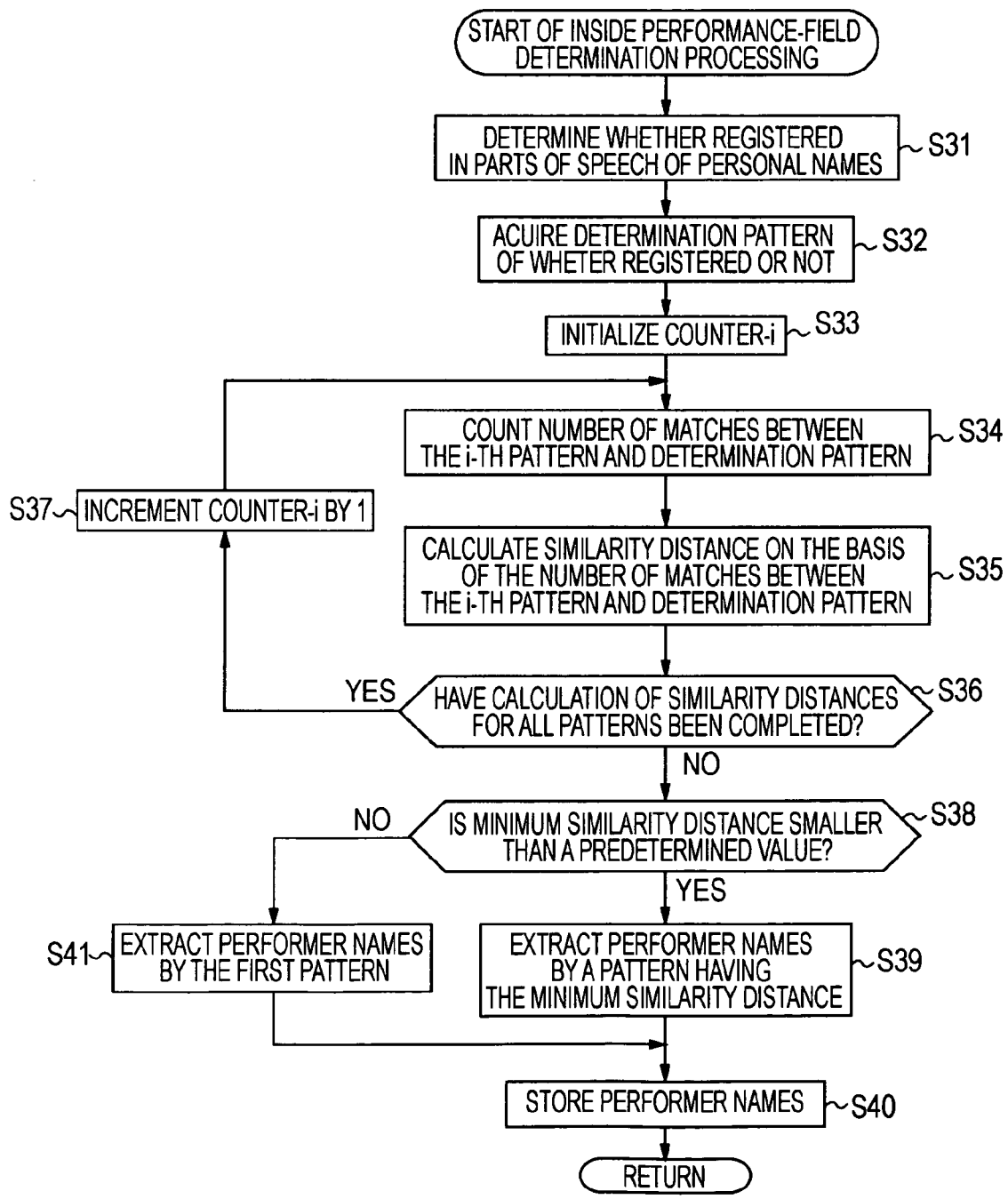
FIG. 6 is a flowchart illustrating inside performer field determination processing.

Here, a description will be given of the inside performer-field determination processing with reference to the flowchart in FIG. 6.

In step S31, the attribute determination section 31 determines whether each of the words is a word registered in an attribute, such as an actor, an actress, etc., for all the words supplied from the division and extraction section 21, and supplies the determination result to the pattern extraction section 32. That is to say, the attribute determination section 31 determines whether the supplied words in the performer field is a personal name having an attribute registered as a personal name, such as an actual actor, actress, etc., rather than a personal name of an attribute indicating a non-existent person, such as a role name, etc.

In step S32, the pattern extraction section 32 generates a determination pattern from the pattern indicating whether there is registration of a personal name on the basis of the determination result supplied from the attribute determination section 31. That is to say, for example, as shown in the upper part of FIG. 7, when the performer field is shown by the area Z3', if the words "INADA GORO", "MURASHITA TOMOKO", and "MEGUMU" are recognized as actual personal names, and the others, "YAMADA OSAMU", "TAGUCHI MIYUKI", "KANIHARA YURI", "KANIHARA TOMOMI", and "YOYOGI SHOKO" are recognized as non-existent personal names, the pattern indicating whether registered or not becomes "WITH", "WITHOUT", "WITH", "WITHOUT", "WITHOUT", "WITHOUT", "WITH", and "WITHOUT" as shown in the lower part of FIG. 7. From this determination result, since the performer name is an actual personal name, the determination result of "with" indicates a performer result. Also, since the determination result of "without" indicates a role name, and thus the pattern extraction section 32 generates "PERFORMER", "ROLE", "PERFORMER", "ROLE", "ROLE", "ROLE", "PERFORMER", and "ROLE" as a determination pattern, and supplies the pattern to the similarity-distance calculation section 33. Here, "PERFORMER" indicates a performer name, and "ROLE" indicates a role name.

In step S33, the similarity-distance calculation section 33 initializes a counter-i, which is not shown in the figure and for identifying the pattern, to 1.

In step S34, the similarity-distance calculation section 33 compares the determination pattern and the i-th pattern stored in the pattern storage section 19, and counts the number of right and wrong. That is to say, for example, as shown in the lower part of FIG. 7, if the determination pattern is "PERFORMER", "ROLE", "PERFORMER", "ROLE", "ROLE", "ROLE", "PERFORMER", and "ROLE", when the counter-i=1, as shown in the upper part of FIG. 8, a pattern P1, which is the first pattern, becomes "PERFORMER", "PERFORMER", "PERFORMER", "PERFORMER", "PERFORMER", "PERFORMER", "PERFORMER", and "PERFORMER". Since "PERFORMER" in the determination pattern are all counted as right, and "ROLE" is counted as wrong, and thus there are five rights and three wrongs in this case.

Figure 8:
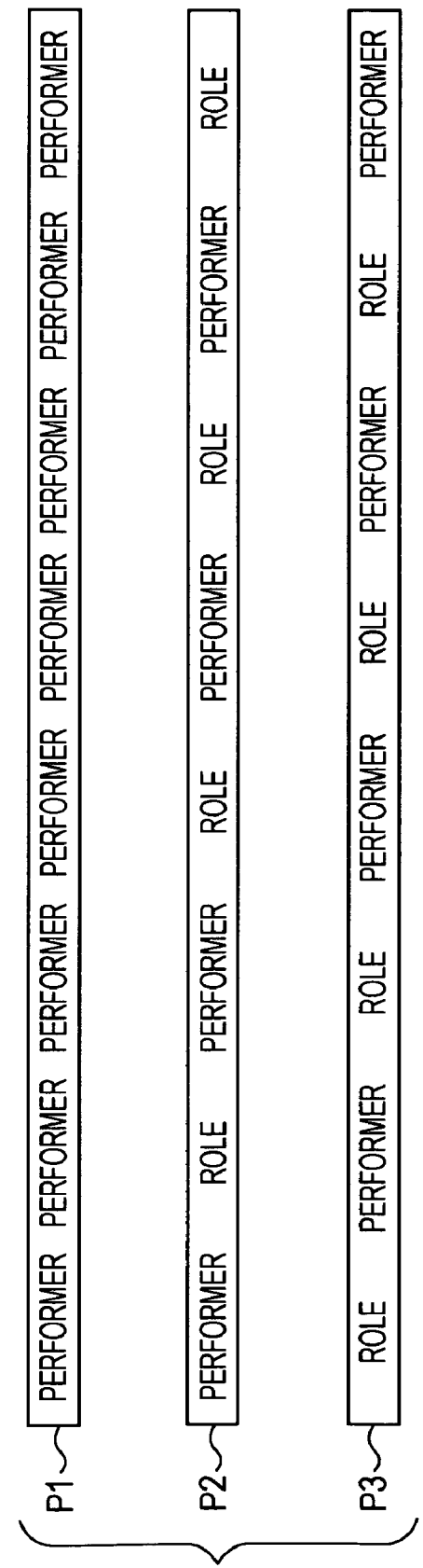
FIG. 8 is a diagram illustrating a calculation method of a similarity distance.

Also, when the counter-i=2, as shown in the middle part of FIG. 8, a pattern P2, which is the second pattern, becomes "PERFORMER", "ROLE", "PERFORMER", "ROLE", "PERFORMER", "ROLE", "PERFORMER", and "ROLE", and thus there are seven rights and one wrong.

Further, when the counter-i=3, as shown in the lower part of FIG. 8, a pattern P3, which is the third pattern, becomes "ROLE", "PERFORMER", "ROLE", "PERFORMER", "ROLE", "PERFORMER", "ROLE", and "PERFORMER", and thus there are one right and seven wrongs.

In step S35, the similarity-distance calculation section 33 calculates the similarity distance between the determination pattern and the i-th pattern on the basis of the count result of the right and wrong, and supplies the similarity distance to the pattern determination section 34. More specifically, for example, when the counter-i is 1, the determination pattern includes eight elements, there are three wrong elements among them, and thus the similarity-distance calculation section 33 calculates that the similarity distance is 37.5% (=$3/8 \times 100$). The similarity distance has a closer value to 0% as the patterns are more similar. In the same manner, when the counter-i is 2, the similarity-distance calculation section 33 calculates that the similarity distance is 12.5% (=$1/8 \times 100$). Furthermore, when the counter i is 3, the similarity-distance calculation section 33 calculates that the similarity distance is 87.5% (=$7/8 \times 100$). In this regard, the same processing is performed for the fourth to the eighth patterns, and thus the description thereof is omitted.

Also, the similarity distance is not limited to the definition described above, and any other method may be used as long as the method shows a quantitative value of the similarity. For example, an edit graph algorithm, etc., may be used.

Figure 9:
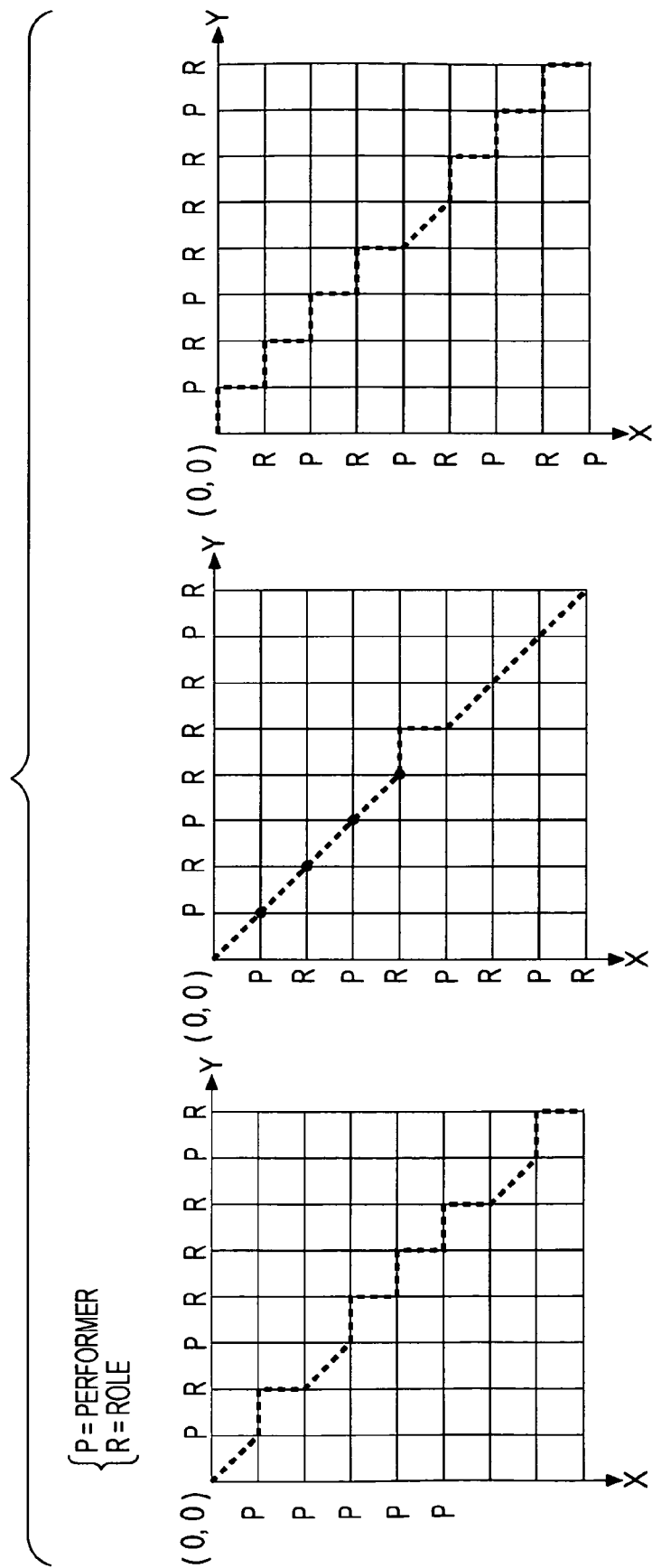
FIG. 9 is a diagram illustrating a calculation method of a similarity distance using an edit graph algorithm.

Here, the edit graph algorithm is, for example as shown in FIG. 9. That is to say, in FIG. 9, the diagrams are the cases where the counter-i is 1, 2, and 3 in sequence from left, respectively. The i-th pattern and the determination patterns are disposed on the X-axis and on the Y-axis, respectively, at individual intervals of one. A comparison is made between the patterns at the part having the same X-coordinate and Y-coordinate in sequence from the origin. If the parts match, a diagonal is drawn, and if the parts do not match, a line is drawn for one in horizontal direction to the X-direction and Y-direction, respectively. For the completed graph by the same processing, the number for a diagonal line is counted as 0, and the number for a horizontal direction line and the vertical direction line are counted as 1, respectively. The total count of these counts is the similarity distance by the edit graph algorithm.

Accordingly, when the counter-i is 1, as shown by the left part of FIG. 9, the number corresponding to "ROLE" in the determination pattern becomes wrong for each, and thus a diagonal is drawn from (0, 0) to (1, 1), two lines are drawn in the X-direction and the Y-direction, respectively from (1, 1) to (2, 2), a diagonal is drawn from (2, 2) to (3, 3), two lines are drawn in the X-direction and the Y-direction, respectively from (3, 3) to (6, 6), a diagonal is drawn from (6, 6) to (7, 7), two lines are drawn in the X-direction and the Y-direction, respectively from (7, 7) to (8, 8). As a result, when the counter-i is 1, the similarity distance using the edit graph algorithm becomes 10. In the same manner, when the counter-i is 2, as shown by the central part of FIG. 9, diagonals are drawn at any parts except that two lines are drawn from (4, 4) to (5, 5), and thus the similarity distance becomes 2. Furthermore, in the same manner, when the counter-i is 3, as shown by the right part of FIG. 9, two lines are drawn at any parts except that diagonals are drawn from (4, 4) to (5, 5), and thus the similarity distance becomes 14.

In step S36, the similarity-distance calculation section 33 determines whether the similarity distances have been calculated between all the patterns stored in the pattern storage section 19 and the determination pattern. For example, if all the similarity distances have not been calculated for all the patterns, the processing proceeds to step S37, the counter-i is incremented by 1, and the processing returns to step S34. That is to say, the processing from steps S34 to S37 is repeated until the calculation of the similarity distances for all the patterns have been completed. If the calculation of the similarity distances for all the patterns have been completed in step S37, in step S38, the pattern determination section 34 determines whether a minimum value of the calculated similarity distances is less than a predetermined threshold value. That is to say, a determination is made on whether the minimum similarity distance is a reliable value. In step S38, if the minimum similarity distance is less than the predetermined threshold value, that is to say, a reliable value, the processing proceeds to step S39.

Figure 7:
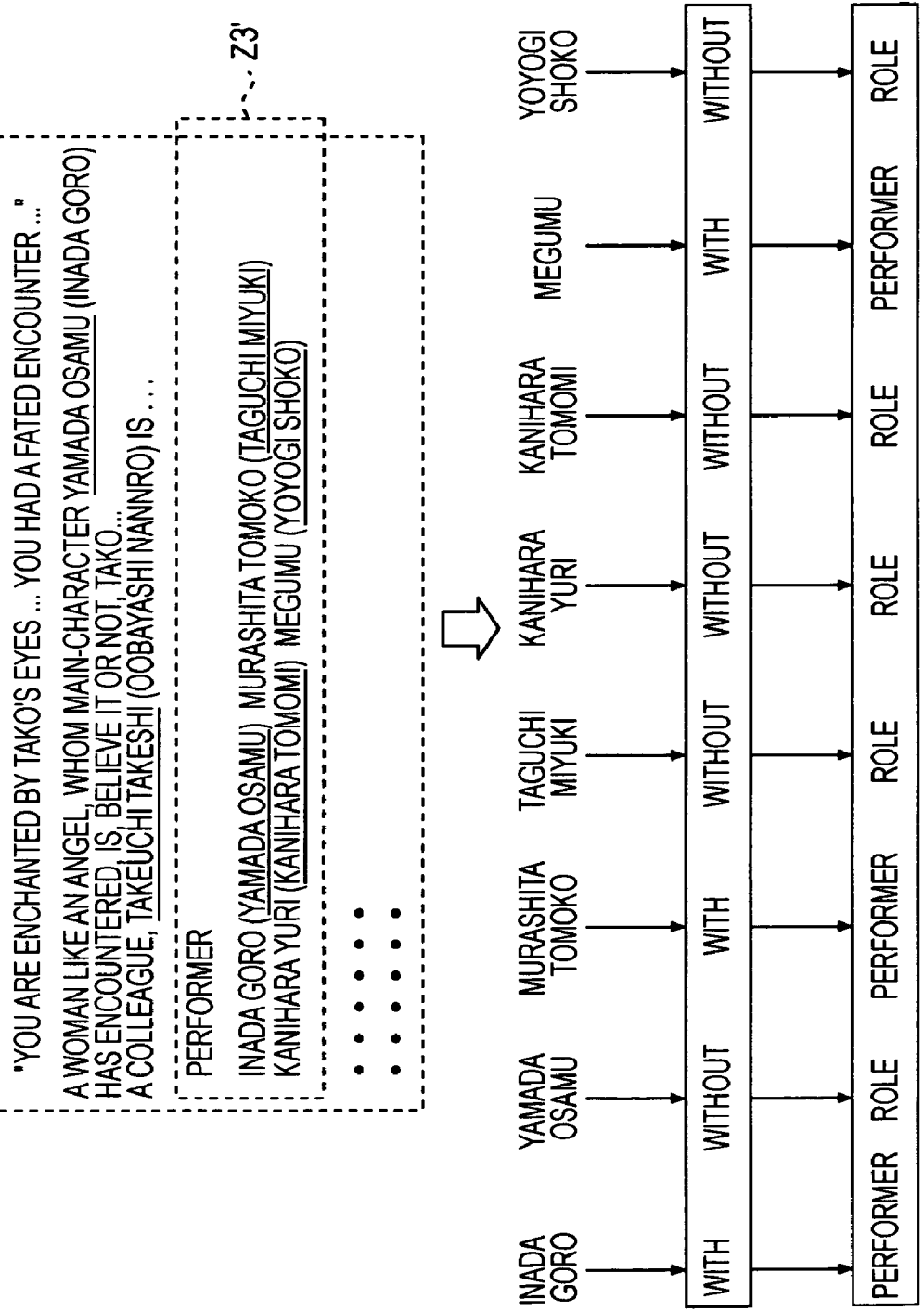
FIG. 7 is a diagram illustrating the inside performer field determination processing.

In step S39, the pattern determination section 34 determines the pattern having a minimum similarity distance as a pattern to be used for extraction of performer names, and supplies the pattern information to the performer-name extraction section 35. The performer-name extraction section 35 extracts performer names from words supplied from the division and extraction section 21 on the basis of the pattern supplied from the pattern determination section 34. That is to say, for example, if the area Z3' in FIG. 7 is supplied as an area inside of the performer-name field, in the case of the first to the third patterns, the second pattern becomes a minimum in the similarity distance, and thus the performer-name extraction section 35 extracts "INADA GORO", "MURASHITA TOMOKO", "KANIHARA YURI", and "MEGUMU" as performer names in sequence, and stores them into the performer-name extraction result storage section 22 in step S40.

On the other hand, in step S38, if the minimum similarity distance is greater than the predetermined value, and is determined not to be a reliable value, in step S41, the pattern determination section 34 extracts all the personal names as performer names using the first pattern, and in step S40, and stores the names into the performer-name extraction result storage section 22.

By the above processing, the inside of the performer field is identified from the EPG display screen, the pattern of the performer names is determined, and the performer names are extracted. Thus, it is possible to determine the pattern of the disposition of performer names in an area, which is a performer name field, having a high possibility that performer names are disposed in a relatively regular way. As a result, it becomes possible to improve the recognition precision of the disposition pattern of performer names. Also, when the reliability of the similarity distance is low, it becomes possible to prevent a failure in extracting performer names by extracting all the personal names inside of the performer field.

Figure 3:
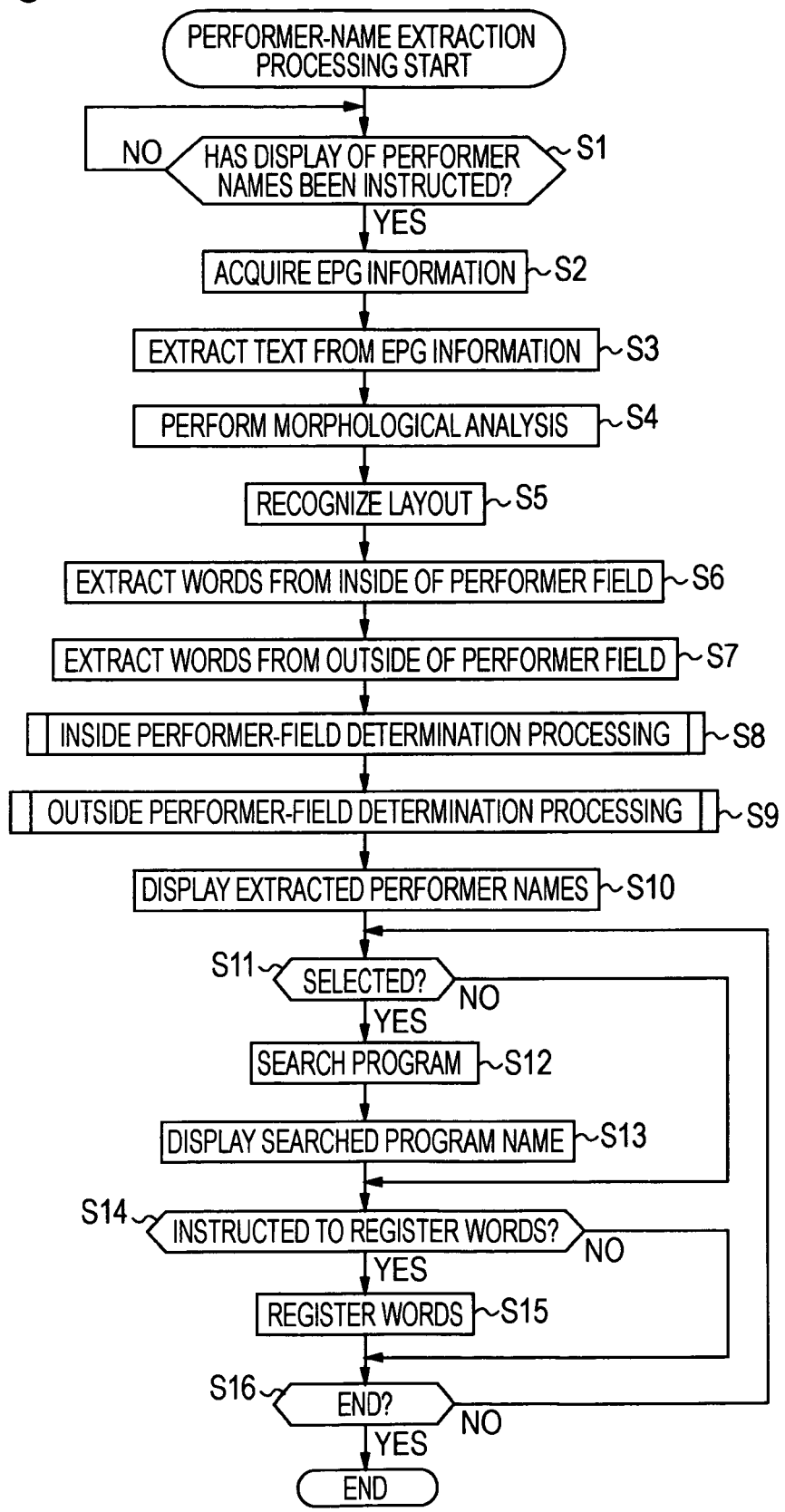
FIG. 3 is a flowchart illustrating performer-name extraction processing.

Here, a description will be returned to the flowchart in FIG. 3.

When the inside performer-field determination processing is completed in step S8, in step S9, the outside performer-field determination section 18 performs the outside performer-field determination processing, extracts the words of performers from the words other than the performer field, and stores the words into the performer-name extraction result storage section 22.

Figure 10:
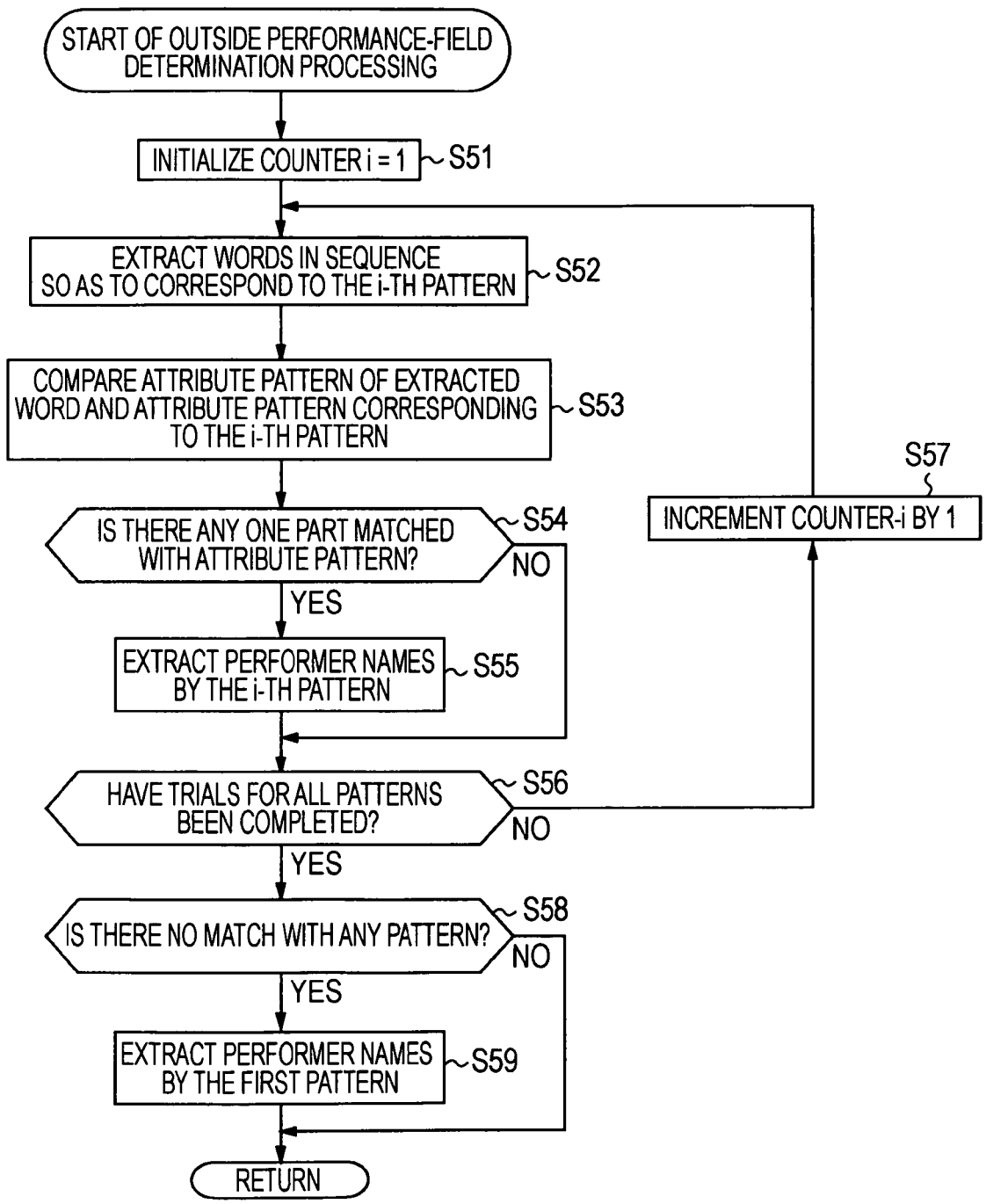
FIG. 10 is a flowchart illustrating outside performer field determination processing.

Here, with reference to the flowchart in FIG. 10, a description will be given of the outside performer-field determination processing.

In step S51, the pattern extraction section 41 initializes the counter-i, which is for identifying a pattern and not shown in the figure, to 1.

In step S52, assuming of an attribute list pattern corresponding to the i-th pattern, the pattern extraction section 41 extracts the pattern from the morphological analysis result outside the performer field, which has been supplied in sequence from the division and extraction section 21, and supplies the pattern to the pattern comparison section 42. At this time, the pattern extraction section 41 informs the pattern comparison section 42 that the i-th pattern is extracted.

In step S53, the pattern comparison sec 42 compares the attribute of a word extracted by the pattern extraction section 41 in sequence from the morphological analysis result outside the performer field, which has been supplied by the division and extraction section 21, and a list pattern of the attributes in the i-th pattern.

That is to say, for example, if the EPG-text-data extraction section 13 extracts text data shown in FIG. 11, the following comparison is made. In FIG. 11, "THIS TIME, A NEWLY-WED ACTION-TALENTED ACTOR, TORIMI SHINNGO AND A HEAVY-DRINKING EXPERIENCED ACTRESS, FUJIKAWA YUMI CHALLENGE Mr. MILLIONAIRE. ATTENTION IS FOCUSED ON TORIMI, WHO GOT A CENTER SHEET SUDDENLY. HE FINALLY HAD A CHANCE TO DIRECTLY CONFRONT Mr. MILLIONAIRE, NOMITANMO BY THIRD TIME LUCKY. THE DREAM OF ONE THOUSAND YEN IS "HE GIVES DELUXE BICYCLES TO GROUP MEMBERS AS PRESENTS, AND GOES ON A CYCLING TOUR WITH THEM". THE CHALLENGE OF TORIMI STARTS".

HOWEVER, TOPIC OF CONVERSATION CENTERED AROUND AN UNTOLD STORY OF SHOOTING OF "THIRD GRADE C-CLASS, TEACHER, KINKU" ASIDE FROM THE QUIZ. THE "FORMER TEACHER" TEKEGAWA TETSUYA PROCEEDED TO THE 14-TH

QUESTION. TORIMI HAS PROCEEDED TO THE 14-TH QUESTION SIMILARLY AS THE FORMER TEACHER WITH THE HELP OF LIFE LINE AT THE RIGHT TIMING. TORIMI ENCOUNTERS QUESTIONS ON SPORTS. CAN TORIMI EVER GO BEYOND THE FORMER TEACHER!? IN ADDITION, FUJIKAWA, WHO CAME TO GAZE AT NOMI-SAN WITH EACH OTHER, HAS A DREAM OF CATCHING ONE THOUSAND YEN FOR THE SAKE OF "FUNDS FOR TOKYO PERFORMANCE OF DRAMA GROUP". PERFORMER HOST: NOMITANMO GUEST CHALLENGER: TORIMI SHINNGO FUJIKAWA YUMI OTHERS" is extracted as text data.

Among the above, for example, "A NEWLYWED ACTION-TALENTED ACTOR, TORIMI SHINNGO AND A HEAVY-DRINKING EXPERIENCED ACTRESS, FUJIKAWA YUMI" is divided, by the morphological analysis, into "NEWLYWED", "ACTION", "-TALENTED", "ACTOR", "•", "TORIMI SHINNGO", ",", "HEAVY-DRINKING", "EXPERIENCED", "ACTRESS", "•", and "FUJIKAWA YUMI". When i=1, that is to say, in the case of the first pattern, the pattern extraction section 41 assumes that the string is "performer name", "symbol", and "performer name", and extracts in sequence, first "NEWLYWED", "ACTION", and "-TALENTED", next "ACTION", "-TALENTED", and "ACTOR", and further "-TALENTED", "ACTOR", and "•", that is to say, extracts three consecutive words as a pattern, and supplies them to the pattern comparison section 42.

The pattern comparison section 42 compares a list pattern of the attributes corresponding to these three words, which has been supplied from the pattern extraction section 41, and a list pattern of the attributes in the first pattern.

In step S54, the pattern comparison section 42 determines whether list patterns match. That is to say, for example, in the case of "A NEWLYWED ACTION-TALENTED ACTOR, TORIMI SHINNGO AND A HEAVY-DRINKING EXPERIENCED ACTRESS, FUJIKAWA YUMI", personal names are only "TORIMI SHINNGO" and "FUJIKAWA YUMI". Even if "TORIMI SHINNGO" and "FUJIKAWA YUMI" are recognized as an actor name and an actress name, respectively, the pattern of "performer", "symbol", and "performer" is not applied, and thus a determination is made that they do not match. Accordingly, the processing proceeds to step S55.

In step S55, the pattern comparison section 42 determines whether all the patterns stored in the pattern storage section 19 have been tested. If not tested, the pattern extraction section 41 increments the counter-i by 1 in step S56, and the processing returns to step S52.

On the other hand, in the lower part of the text data, from the portion of "PERFORMER HOST: NOMITANMO GUEST CHALLENGER: TORIMI SHINNGO FUJIKAWA YUMI OTHERS", the words "PERFORMER", "HOST", ":", "NOMITANMO", "GUEST", "CHALLENGER", ":", "TORIMI SHINNGO", "FUJIKAWA YUMI", and OTHERS" are extracted. When the counter-i=2, the pattern extraction section 41 assumes that the string is "role name" and "performer name", and first extracts PERFORMER", "HOST", and ":", next extracts "HOST", ":", and "NOMITANMO", and further extracts ":", "NOMITANMO", and "GUEST", that is to say, extracts three consecutive words in sequence, and supplies them to the pattern comparison section 42.

In this case, assuming that the attributes of the extracted "HOST", ":", "NOMITANMO" are registered such that "HOST" is a role name, ":" is a symbol, and "NOMITANMO" is a famous person, in step S54, the pattern comparison section 42 regards that as matched with the third pattern, and thus the processing proceeds to step S55.

In step S55, the pattern comparison section 42 instructs the performer-name extraction section 43 to extract performer names with the matched pattern. Thus, the performer-name extraction section 43 extracts performer names on the basis of the third pattern, "ROLE NAME", "SYMBOL", and "PERFORMER NAME", and stores them into the performer-name extraction result storage section 22. Then, the processing proceeds to step S56.

That is to say, in the case of the lower part of the text data in FIG. 11, the word that is disposed after "SYMBOL" is a performer name. Thus, "NOMITANMO" is extracted as a performer, because the attribute disposition pattern is "ROLE NAME", "SYMBOL", and "PERFORMER NAME" from the disposition of "HOST", ":", "NOMITANMO". Also, "TORIMI SHINNGO" is extracted as a performer from the disposition of "CHALLENGER", ":", "TORIMI SHINNGO". The extracted performers are stored in the performer-name extraction result storage section 22.

In step S56, when it is determined that all the patterns have been tested, that is to say, in this case, when the counter-i is greater than 8, because the counter-i indicating the number of list patterns counts up to 8, in step S58, the pattern comparison section 42 determines whether there is any pattern to match for all the pattern. In this case, the third pattern is matched, and thus the processing of step S59 is skipped.

On the other hand, in step S58, if no pattern is matched, in step S59, the pattern comparison section 42 instructs the performer-name extraction section 43 to extract performer names with the first pattern. That is to say, when no pattern is matched, personal names as performers are not extracted, and thus as long as a list pattern being sandwiched by some symbol, any string that can be read as a personal name is all read.

Also, for example, when text data is extracted from EPG data as shown in FIG. 12, the text data is either the first pattern, namely "performer name", "symbol", and "performer name", or the second pattern, "performer name", "symbol", and "role name" from the display of the lower part "KUROISHI SUZUKO: TANIGAWA KYOKOKUZUYAMA HARUKI: ODA KEISUKESHIMANAKA SAORI: OOBAYASHI MAOOOKAGE TAMIO: HIGASHIMURA MASAHIKOFUKAKURA MICHIRU: SACHIKOKASHIWAMOTO MAKI: OOIKE EIKOOOKAGE TAKANOBU: IWAI MASANORIKUROISHI TORU: AMANO HIROKIKUZUYAMA MICHIZO: NAKADUME ISAO". That is to say, in the case of a drama, etc., a personal name can be recognized either as a "role name" or "performer name". For example, assuming that the text data is actually the third pattern, if "ODA KEISUKE" is recognized as a personal name of a famous actor recognized by the morphological analysis processing as an actor name, at least "KUZUYAMA HARUKI", ":", and "ODA KEISUKE" is recognized as "role name", "symbol", and "performer name", and thus it is regarded that at lest one of the text data matches the third pattern. Accordingly, "TANIGAWA KYOKO", "ODA KEISUKE", "OOBAYASHI MAO", "HIGASHIMURA MASAHIKO", "SACHIKO", "OOIKE EIKO", "IWAI MASANORI", "AMANO HIROKIKU", and "NAKADUME ISAO" are extracted as performer names.

Also, when all the names are allowed to be recognized only as personal names in the lower part of FIG. 12, the string is recognized as none of the patterns in step S58. Thus, in step S59, all the personal names, "KUROISHI SUZUKO", "TANIGAWA KYOKO", "KUZUYAMA HARUKI", "ODA KEISUKE", "SHIMANAKA SAORI", "OOBAYASHI MAO", "OOKAGE TAMIO", "HIGASHIMURA MASA-HIKO", "FUKAKURA MICHIRU", "SACHIKO", "KASHIWAMOTO MAKI", "OOIKE EIKO", "OOKAGE TAKANOBU", "IWAI MASANORI2", "KUROISHI TORU", "AMANO HIROKI", "KUZUYAMA MICHIZO", and "NAKADUME ISAO" are extracted as performer names. In this case, there is a possibility of including an error as performer names. However, at least all the performer names are displayed.

By the processing as described above, a list pattern of attributes by which performers are displayed is set in advance, and a comparison is made between the morphological analysis result and the set list pattern of attributes. By extracting performers on the basis of the list pattern of the matched attributes, it becomes possible to efficiently extract performers.

Here, a description will be given by referring back to the flowchart in FIG. 3.

When the outside performer-field determination processing is completed in step S9, in step S10, the output section 23 reads the performer names stored in the performer-name extraction result storage section 22, and displays them in the display area 6.

Figure 13:
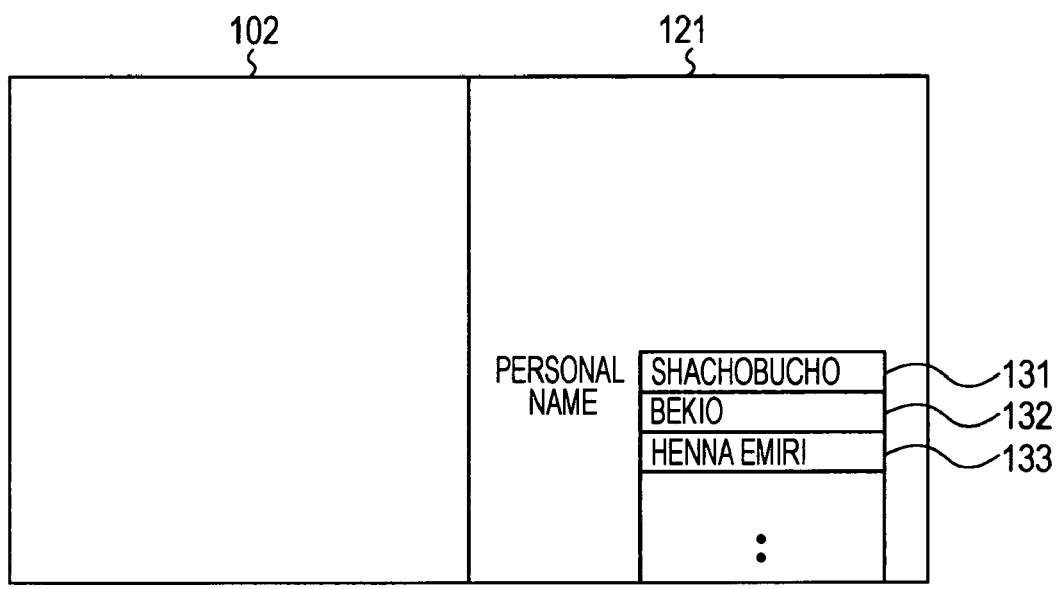
FIG. 13 is a diagram illustrating a display example of a display screen of personal names.

By this processing, the display section 6 displays performer names as personal names, for example, by the screen shown in FIG. 13. In FIG. 13, a personal-name display field 121 is disposed at the right side of the display field 102 of a normal broadcast program, and the buttons 131 to 133, which are operated when selecting the extracted personal names are disposed corresponding to the extracted performer names. In FIG. 13, a button 131 is disposed for the performer name, "SHACHOBUCHO", a button 132 is disposed for the performer name, "BEKIO", and a button 133 is disposed for the performer name, "HENNA EMIRI".

In step S11, the program search section 25 determines whether a personal name that is a performer name is selected by any one of the buttons 131 to 133 having been operated by the operation of the operation section 5. For example, in FIG. 13, when the button 131 is operated by the operation section 5 to select the keyword "SHACHOBUCHO", in step S12, the program search section 25 searches the program using the keyword "SHACHOBUCHO" on the EPG information supplied from the EPG acquisition section 12 or the iEPG acquisition section 14 (searches the program information of the EPG information for the program including the keyword "SHACHOBUCHO"), and displays the search result onto the display section 6, for example as shown in FIG. 14 in step S13. Also, when no selection is made in step S11, the processing of steps 12 and 13 is skipped.

In FIG. 14, a selection keyword tab 151 is disposed, and the selected keyword is shown. In FIG. 14, "SHACHOBUCHO", which is the selected keyword, is shown. Under the keyword, a search-result display field 152 is disposed, and the programs searched by the selected keyword are displayed. In FIG. 14, in the uppermost line, "TOMORROW 1:05 AM MOVIE THEATER "OVER THE COUNTER"" is displayed. In the second line, "2:30 AM howbiz Extra #201" is displayed. In the third line, "9:30 AM THURSDAY WESTERN MOVIE THEATER "INDIAN GAME". In the fourth line, "0:00 AM INDIES MOVIE FESTIVAL—VOLUNTARY MOVIE" is displayed. In the fifth line, "0:50 AM MOVIE THEATER "MY HOME"" is displayed. In the sixth line, "2:30 AM BILLY TALKS OF HIMSELF" is displayed. In the seventh line, "11:00 PM MOVIE "GRAVE AND MARRIAGE" (FREE OF CHARGE)" is displayed. Each program name and its broadcast time are displayed. For example, by selecting any one of the display fields of these programs, a reservation for recording the program may be provided. Under the search-result display field, a button 153 displaying "RETURN" is disposed at the right side. The button 153 is operated when the display of the selection keyword tab 151 is completed and the screen is returned. Also, a button 154 displaying "OPTION" is disposed at the left side to the button 153. The button 154 is operated when an option operation is performed.

In step S14, the program search section 25 determines whether the operation section 5 has been operated to instruct word registration. For example, when the button 154 is operated by the operation section 5, an option-operation dialog box 171 is displayed as shown in FIG. 15, further, a button 181 displaying "word registration" in the option-operation dialog box 171 is pressed and the word registration is instructed, in step S15, the program search section 25 stores "SHACHOBUCHO", which is a currently selected word, into the performer-name extraction result storage section 22. By this processing, the performer name for which word registration has been instructed is consistently displayed in the personal name display field 121 even though the name is not included in the EPG data.

In this regard, the option-operation dialog box 171 in FIG. 15 is provided with the button 181 to be operated when "word registration" is instructed and a button 182 to be operated when the option operation is canceled.

On the other hand, in step S14, if the word registration is not instructed, the processing of step S15 is skipped.

In step S16, a determination is made on whether end has been instructed or not. If not instructed, the processing returns to step S11. If end has been instructed, the processing is terminated.

By the above processing, the area of the performer field is identified from the layout information on the basis of the information included in the Electric Program Guide (EPG), and the information inside of the performer field is subjected to the pattern analysis by the disposition of information including a performer name and a role name and without including a symbol, because there is a high possibility of having regular disposition of performer names. The performer names are extracted on the basis of the analyzed pattern, and thus it becomes possible to extract performer names with higher precision.

Also, the information outside of the performer field is subjected to the pattern analysis on the basis of the disposition of a performer, a role, and additionally a symbol, because there is a possibility of not having regular disposition of performer names compared with the inside of the performer field. The performer names are extracted on the basis of the analyzed pattern, and thus it becomes possible to extract performer names with higher precision.

As a result, it becomes possible to extract performer names with high precision and with high efficiency by distinguishing the inside performer field and the outside performer field and changing the way of extracting performer names.

Also, in the above, a description has been given of an example in which meta-data of a content is an EPG. However, the meta-data may be other than an EPG as long as meta-data is additional information of a content. For example, the meta-data may be an ECG (Electronic Contents Guide), etc.

Further, in the above, a description has been given of an example in which the content is a television program. However, the content may be other than a television program as long as a content has meta-data. For example, the content may be a moving image content or a music content, which is downloaded through a network. Alternatively, the content may be a moving image content or a music content, which is stored in a data storage medium, such as a DVD (Digital Versatile Disc), a BD (Blu-Ray Disc), etc.

According to an embodiment of the present invention, it becomes possible to efficiently extract information on performer names of the content out of information included in the meta-data of a content.

The above-described series of processing can be executed by hardware or can be executed by software. When the series of processing is executed by software, the programs constituting the software are built in a dedicated hardware of a computer. Alternatively, the various programs are installed, for example in a general-purpose personal computer capable of executing various functions from a program recording medium.

FIG. 16 illustrates an example of a configuration of a general-purpose personal computer. This personal computer includes a CPU (Central Processing Unit) 1001. An input/output interface 1005 is connected to the CPU 1001 through a bus 1004. A ROM (Read Only Memory) 1002 and a RAM (Random Access Memory) 1003 are connected to the bus 1004.

An input section 1006 including an input device, such as a keyboard for a user inputting operation commands, a mouse, etc., an output section 1007 for displaying a processing operation screen and an image of a processing result, a storage section 1008 including a hard disk drive storing programs and various data, and a communication section 1009 including a LAN (Local Area Network) adapter, etc., and performing communication processing through a network represented by the Internet are connected to the input/output interface 1005. Also, a drive 1010 for reading data from and writing data to a removable medium 1011, such as a magnetic disk (including a flexible disk), an optical disc (including a CD-ROM (Compact Disc-Read Only Memory) and a DVD (Digital Versatile Disc)), a magneto-optical disc (including MD (Mini Disc)), or a semiconductor memory, etc., is connected.

The CPU 1001 performs various kinds of processing in accordance with the programs stored in the ROM 1002, or the programs read from the removable medium loll, such as a magnetic disk, an optical disc, a magneto-optical disc, a semiconductor memory, or the like, installed in the storage section 1008, and loaded from the storage section 1008 into the RAM 1003. The RAM 1003 also stores necessary data for the CPU 1001 to perform various kinds of processing appropriately.

In this regard, in this specification, the steps describing the programs include the processing to be performed in time series in accordance with the described sequence as a matter of course. Also, the steps include the processing which is not necessarily executed in time series, but is executed in parallel or individually.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus for processing television content comprising:
    an acquisition section to acquire meta-data of the content; and
    a central processing unit, comprising a processor and memory, programmed to function as:
    a morphological analyzing section to perform a morphological analysis on text information included in the meta-data of the content;
    a layout recognition and extraction section to recognize a layout for each described content from a morphological analysis result obtained from the morphological analyzing section, to recognize a location within the layout of a performer field having a performer name or performer names therein, and to read inside information from inside the performer field and outside information from outside the performer field;
    an inside performer-field determination section to receive the inside information without the outside information and to extract a respective inside performer name or names therefrom;
    wherein the inside performer-field determination section includes a similarity-distance calculation section to calculate a similarity distance between information of the inside information and a number of list patterns of predetermined performer names, and an extraction section to extract the respective outside performer name therefrom which has a smallest similarity distance;
    an outside performer-field determination section to receive the outside information without the inside information and to extract a respective outside performer name or names therefrom, such that the outside performer-field determination section is operable to extract the respective outside performer name or names from a portion of the layout other than the performer field
    wherein the outside performer-field determination section includes a comparison section to compare information of the outside information with a number of list patterns of predetermined performer names; and
    a performer-name extraction result storage section to store the extracted performer names.

2. The information processing apparatus according to claim 1, wherein the list pattern of predetermined performer names includes a list pattern of "performer name, symbol, performer name, symbol . . . ", "performer name, symbol, role name, performer name . . . ", "role name, symbol, performer name, symbol, role name . . . ", or "performer name, performer name . . . ".

3. The information processing apparatus according to claim 1, wherein the content includes a television program, and the meta-data includes information on the television program.

4. A method of processing television content information, comprising:
    acquiring meta-data of the content;
    performing, by a processor, a morphological analysis on text information included in the meta-data of the content;
    recognizing a layout for each described content from a morphological analysis result, recognizing a location within the layout of a performer field having a performer name or performer names therein, and reading inside information from inside the performer field and outside information from outside the performer field;
    receiving the inside information without the outside information and extracting a respective inside performer name or names therefrom by use of an inside performer-field determination section;
    wherein the inside performer-field determination section includes a similarity-distance calculation section to calculate a similarity distance between information of the inside information and a number of list patterns of predetermined performer names, and an extraction section to extract the respective outside performer name therefrom which has a smallest similarity distance;
    receiving the outside information without the inside information and extracting a respective outside performer name or names therefrom by use of an outside performer-field determination section, such that the outside performer-field determination section is operable to extract the respective outside performer name or names from a portion of the layout other than the performer field wherein the outside performer-field determination section includes a comparison section to compare information of the outside information with a number of list patterns of predetermined performer names; and storing the extracted performer names in a performer-name extraction result storage section.

5. A program storage medium having stored thereon a program for causing a computer to perform processing of television content, said processing comprising:

acquiring meta-data of the content;

performing a morphological analysis on text information included in the meta-data of the content;

recognizing a layout for each described content from a morphological analysis result, recognizing a location within the layout of a performer field having a performer name or performer names therein, and reading inside information from inside the performer field and outside information from outside the performer field;

receiving the inside information without the outside information and extracting a respective inside performer name or names therefrom by use of an inside performer-field determination section;

wherein the inside performer-field determination section includes a similarity-distance calculation section to calculate a similarity distance between information of the inside information and a number of list patterns of predetermined performer names, and an extraction section to extract the respective outside performer name therefrom which has a smallest similarity distance;

receiving the outside information without the inside information and extracting a respective outside performer name or names therefrom by use of an outside performer-field determination section, such that the outside performer-field determination section is operable to extract the respective outside performer name or names from a portion of the layout other than the performer field wherein the outside performer-field determination section includes a comparison section to compare information of the outside information with a number of list patterns of predetermined performer names; and storing the extracted performer names in a performer-name extraction result storage section.

\* \* \* \* \*